United States Patent
Durif

(10) Patent No.: US 7,665,556 B2
(45) Date of Patent: Feb. 23, 2010

(54) HEAVY VEHICLE

(75) Inventor: Pierre Durif, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 171 days.

(21) Appl. No.: 11/334,895

(22) Filed: Jan. 17, 2006

(65) Prior Publication Data

US 2006/0131090 A1    Jun. 22, 2006

Related U.S. Application Data

(63) Continuation of application No. PCT/EP2004/007662, filed on Jul. 12, 2004.

(30) Foreign Application Priority Data

Jul. 17, 2003    (FR)    ................................... 03 08752

(51) Int. Cl.
*B62D 61/10*    (2006.01)

(52) U.S. Cl. .................. 180/22; 180/24.03; 180/24.06; 180/24.08; 152/376

(58) Field of Classification Search .................. 180/22, 180/24.03, 24.06, 24.08, 266, 900, 905; 152/320, 152/376

See application file for complete search history.

(56) References Cited

U.S. PATENT DOCUMENTS

| | | | | |
|---|---|---|---|---|
| 3,319,545 A | * | 5/1967 | Seaman et al. | 404/125 |
| 3,773,348 A | * | 11/1973 | Davis | 280/124.114 |
| 4,155,415 A | | 5/1979 | van der Lely | |
| 4,181,315 A | * | 1/1980 | van der Lely | 280/834 |
| 4,202,454 A | * | 5/1980 | Browne et al. | 213/86 |
| 4,282,952 A | * | 8/1981 | Bartley | 188/18 A |
| 4,359,116 A | * | 11/1982 | Mankey | 180/6.48 |
| 4,458,772 A | * | 7/1984 | Oswald et al. | 180/6.2 |
| 4,591,018 A | | 5/1986 | van der Lely | |

(Continued)

FOREIGN PATENT DOCUMENTS

DE    26 37 149 A    3/1978

(Continued)

OTHER PUBLICATIONS http://www.carchaos.com/miscellaneous/mine_trucks/terex_titan/.*

(Continued)

*Primary Examiner*—Toan C To
(74) *Attorney, Agent, or Firm*—Cohen Pontani Lieberman & Pavane LLP

(57) ABSTRACT

A heavy vehicle of a mass greater than 500 metric tons, such as a transport vehicle or a "civil engineering" vehicle, fitted with tires of radial structure of a diameter greater than three meters fifty having an axial width greater than 37 inches, and comprising a front axle provided with at least two tires and a rear axle comprising at least four tires and by which is transmitted at least part of the motive power. At least two tires on the front axle transmit part of the motive power at least when the vehicle is following a trajectory which is not rectilinear and, at least when the vehicle is following a trajectory which is not rectilinear, the tires of an axle transmitting at least part of the motive power have different speeds of rotation.

8 Claims, 2 Drawing Sheets

U.S. PATENT DOCUMENTS

| | | | |
|---|---|---|---|
| 4,948,167 A * | 8/1990 | Kopczynski | 180/24.09 |
| 5,182,712 A * | 1/1993 | Kyrtsos et al. | 701/50 |
| 5,289,905 A * | 3/1994 | Braschler | 188/296 |
| 5,636,699 A * | 6/1997 | Pitman et al. | 175/203 |
| 6,105,707 A * | 8/2000 | Tamura et al. | 180/307 |
| 6,148,940 A | 11/2000 | Leisenring et al. | |
| 6,247,233 B1 * | 6/2001 | Hinton et al. | 29/894.3 |
| 6,631,747 B2 | 10/2003 | Durif | |
| 6,640,857 B2 * | 11/2003 | Ikeda | 152/158 |
| 2002/0046794 A1 | 4/2002 | Durif | |

FOREIGN PATENT DOCUMENTS

| | | |
|---|---|---|
| FR | 2 299 204 A | 8/1976 |
| FR | 2 551 016 A | 3/1985 |
| WO | WO 00/71365 A | 11/2000 |
| WO | WO 00/71365 A1 | 11/2000 |

OTHER PUBLICATIONS http://tirupati-international.com/product/truck/T282/t282%20mid.htm.*

Liebherr Minning Equipment Co. Press Release Oct. 16, 1998, Liebherr T282 Design and Development).*

"Caterpillar 797B Mining Truck Specifications", Dec. 2003, pp. 1-19.

* cited by examiner

HEAVY VEHICLE

CROSS-REFERENCE TO RELATED APPLICATIONS

This application is a U.S. Continuation Application of International Application PCT/EP2004/007662 filed on Jul. 12, 2004.

BACKGROUND OF THE INVENTION

1. Field of the Invention

The invention relates to a heavy vehicle such as a transport vehicle or a "civil engineering" vehicle, of a mass greater than 500 metric tons and fitted with tires of a diameter greater than three meters fifty having an axial width greater than 37 inches.

2. Description of the Related Art

Such vehicles, generally designed for carrying heavy loads, comprise a front steering axle comprising two steering wheels and a rear axle, which is most frequently rigid, comprising four driving wheels distributed in pairs on each side.

An axle is defined as an assembly of the elements enabling the fixed structure of the vehicle to be connected to the ground.

The axial or transverse direction of the tire is parallel to the axis of rotation of the tire.

The circumferential direction of the tire, or longitudinal direction, is the direction corresponding to the periphery of the tire and defined by the rolling direction of the tire.

The axis of rotation of the tire is the axis around which it turns in normal use.

In the case of vehicles, in particular intended for use in mines or quarries for transporting loads, the problems of access and demands of production lead the manufacturers of these vehicles to increase their loading capacity. It follows that the vehicles become ever larger and thus ever heavier in themselves and are capable of transporting an ever greater load. The current masses of these vehicles may reach several hundred metric tons, the same being true of the load to be transported; the total mass may reach 600 metric tons.

At present, as stated above, vehicles of this type, such as dumpers used in mines, comprise a rear driving axle on which are mounted four wheels, arranged in pairs, to respond to these demands.

Furthermore, the dimensions of said wheels and consequently those of the tires and in particular the rigidity of the lower zones require said wheels to be made in several parts to allow mounting of the tire on a rim. The operations involved in mounting and demounting said tires in the event of replacement or maintenance are long and tedious. The number of clamping parts which have to be handled during these operations may be greater than 200, and very high levels of clamping torque are associated therewith. The time taken for these operations is consequently long and therefore detrimental to the productivity sought during exploitation of said mines.

Since current demands tend towards a constant increase in the loading capacity of these vehicles, the various parameters listed above have resulted in widening of the tires so as to increase the volume of air therein. At around 4 meters, tire diameter is now such that it is virtually impossible to increase it further, in particular for reasons of transportation of said tires. In fact, the dimensions of said tires will be limited by transportation thereof, in particular by road widths and bridge headroom. It is likewise virtually impossible to decrease the rim diameter, which in particular allows positioning of the driving torque transmission system and of the braking systems.

During their studies, the inventors have succeeded in demonstrating that these "widened" tires do effectively allow an increase in transported load but exhibit various drawbacks. Tests have in fact shown that the wear resistance of these tires is reduced, in particular with respect to the axially outer tires mounted on the rear axle, due in particular to torque phenomena induced between the tires in particular on bends. More frequent tire changes reduce the efficiency of said vehicles. Current vehicles are equipped with differential gears between the wheels of one and the same axle disposed either side of an axis of symmetry of said axle, to limit said phenomena.

Furthermore, it has been demonstrated that, under certain travel conditions with a certain load, handling of the vehicle, in particular over curved trajectories, is greatly reduced. In fact, when the tires of the front axle are turned, in particular when the vehicle is loaded and for passing round bends with relatively small radii of curvature, it is possible that the vehicle may follow a substantially rectilinear trajectory. It would appear, in fact, that under certain loading and travel conditions, handling of such a vehicle over a curved trajectory, when fitted with four tires such as described above on the rear axle, is very difficult or indeed impossible, since the vehicle does not respond to the turning imposed by the tires of the front axle. These conditions may furthermore result in splitting and destruction of the tires of the front axle and thus once again in more frequent tire changes.

Furthermore, patent application WO 00/71365 describes a method making it possible to simplify tire mounting, the latter being mounted directly on the hub, which serves as the rim. Independent rings then act as rim seats and are held in place by locking rings, which are connected firmly to the hub as a result in particular of being complementary in profile.

SUMMARY OF THE INVENTION

The inventors thus set themselves the task of improving the properties of the tires of these heavy vehicles in terms of wear with regard to those of current tires, in particular with a view to improving vehicle efficiency and, in addition, to improving the handling conditions of said vehicles, whatever the use and travel conditions.

This aim is achieved according to the invention by a heavy vehicle, such as a transport vehicle or a "civil engineering" vehicle, of a mass greater than 500 metric tons, fitted with tires of a diameter greater than three meters fifty having an axial width greater than 37 inches, and comprising a front axle provided with at least two tires and a rear axle comprising at least two tires and by which is transmitted at least part of the motive power, at least two tires of the front axle transmitting part of the motive power at least when the vehicle is following a trajectory which is not rectilinear and, at least when the vehicle is following a trajectory which is not rectilinear, the tires of an axle transmitting at least part of the motive power having different speeds of rotation.

According to one advantageous embodiment of the invention, at least two tires of the front axle permanently transmit part of the motive power.

The inventors have succeeded in demonstrating that coupling of the tires fitted on the rear axle results in stresses in the tires which on the one hand accentuate the wear to said tires and, more specifically, to the axially outer tires when the vehicle is following a curved trajectory and on the other hand create stresses which oppose handling of the vehicle over these trajectories.

The involvement of two tires of the front axle transmitting part of the motive power will promote handling of the vehicle and contribute to a reduction in wear to the tires of the rear axle, in particular when the part of the motive power transmitted by these tires is reduced due to the involvement of the tires of the front axle in transmission of the motive power.

A reduction in wear to the tires fitted on the front axle has also been noted, in particular on a bend. The inventors explained this reduction in wear to the tires fitted to the front axle as being due in particular to the reduction in load transfer and transverse forces; the inventors have demonstrated that, according to the invention, the motive power generates directional forces in the front axle prior to a locking situation due to the thrust forces of the rear axle and to the inertia forces at relatively high speeds. The locking situation corresponds to a situation mentioned above in which the vehicle follows a substantially rectilinear trajectory despite the wheels of the front axle being turned.

Since this type of locking situation increases with the vehicle load and the speed thereof, it would appear that the vehicle according to the invention makes it possible to ensure the possibility of turning, whether the vehicle has a greater load and/or is moving at higher speeds and/or the radius of curvature of the trajectory to be followed is smaller in comparison with the current situation.

Furthermore, the different speeds of rotation of all the tires of one and same axle transmitting at least part of the motive power also contribute to a reduction in wear to said tires, it being possible to limit the torque phenomena induced between the various tires of one and the same axle, in particular in trajectories which are not rectilinear.

According to an advantageous embodiment of the invention, the front axle comprises four tires, at least two tires of said front axle transmitting part of the motive power, as stated above in the case of the rear axle. Preferably, the two axially inner tires are preferably the tires transmitting the motive power.

According to such an embodiment, the invention also advantageously proposes to combine the vehicle as defined above with wheel-less mounting on the front axle, the tires being set in place on the hub provided to this end through the intermediary of first mounting rings forming the tire bead seats and second locking rings ensuring positioning of said first rings and therefore of the tires. Mounting of this type has already been described in the above-cited patent application WO 00/71365. According to this embodiment, the invention requires that recesses be provided on the hub to accommodate the locking rings, positioning of two of these rings being necessary per tire.

According to one variant embodiment of the invention, the rear axle comprises four tires, associated in pairs on either side of the axle, at most two of these tires permanently transmitting the motive power.

According to a preferred embodiment of the invention, the axially inner tires fitted on the rear axle permanently transmit at least part of the motive power.

According to this variant embodiment of the invention, the rear axle comprises at least two tires, and preferably the two axially outer tires of the rear axle, which do not advantageously transmit the motive power and have as their only essential function that of bearing part of the load. Such an embodiment makes it possible to reduce the longitudinal stresses, due to the torques induced between the tires, arising in particular when the vehicle is following the course of a bend. In fact, when a vehicle comprising at least twin tires follows the course of a bend, the tires which are axially furthest to the outside cover a greater distance if positioned on the outside of the bend and a smaller distance if positioned on the inside of the bend. This phenomenon is accentuated in the context of the invention by the width of the tires. Such an embodiment therefore makes it possible to reduce still further the causes of premature wear to these tires.

It would appear, moreover, that the use of four tires on the rear axle is not favorable to efficiency when it is necessary to replace a tire, if they are mounted on independent wheels. In fact, in particular when it is necessary to change a tire located axially to the inside with regard to the other two, it is necessary to remove the first two wheels in order to gain access to the third before engaging in the replacement procedure; this therefore involves a large number of operations and is not therefore favorable to vehicle efficiency.

The invention thus advantageously proposes, as described above in the case of the front axle, that the tires be mounted in wheel-less manner, said tires being set in place on the hub provided to this end through the intermediary of first mounting rings forming the tire bead seats and second locking rings ensuring positioning of said first rings and therefore of the tires, according to a method as described in patent application WO 00/71365 cited above. According to this embodiment, the invention requires that four recesses be provided on the rear hub on either side to accommodate the locking rings, positioning of two of these rings being necessary per tire.

Another variant embodiment of the invention provides for at least two tires of the rear axle, preferably the tires of the rear axle axially to the outside, not to transmit the motive power solely when the vehicle is following a trajectory which is not rectilinear, or preferably when it is following a bend whose radius of curvature is less than a predetermined value. Such an embodiment may be achieved by a decoupling device between said tires and the members transmitting the motive power. Such a device may be controlled by the vehicle's steering members according to any means known to the person skilled in the art.

In the same manner, the invention advantageously provides for at least two tires of the front axle to transmit part the motive power only when the vehicle is following a trajectory which is not rectilinear, or preferably when it is following a bend whose radius of curvature is less than a predetermined value.

According to other variant embodiments of the invention and in accordance therewith, when all the tires on one and the same axle transmit at least part of the motive power, in addition to the differential gear mentioned above the axle is fitted with a device imparting to the various tires different speeds of rotation adapted to limit the wear of the various tires, in particular on bends.

The invention also provides for a vehicle such as described above, each of whose tires is associated with an electric motor, for example incorporated in the wheel associated with the tire or in the axle hub in the vicinity of a tire in the case of an embodiment according to the method described in document WO 00/71365 described above.

According to this embodiment, the use of electric motors associated with a tire makes it possible in particular to distribute the motive power variably as a function of the tires and of the trajectory followed.

In the same manner, the invention also provides for some only of the tires transmitting the motive power to be controlled by electric motors; these tires may for example be the tires of the front axle, those of the rear axle being associated with conventional motorization and transmission.

When the motive power is due only to the electric motors, the invention also provides for certain ones only of the tires to be associated with such electric motors and for the other tires to have only load-bearing as their essential function.

Whatever the embodiment of the invention, it is always advantageously provided for all the tires to remain individually associated with a braking device, so as to be able to slow down or stop this type of vehicle under the best conditions.

BRIEF DESCRIPTION OF THE DRAWINGS

Other advantageous details and features of the invention will become clear below from the description of examples of embodiment of the invention made with reference to FIGS. 1 and 2, in which.

DETAILED DESCRIPTION OF THE PREFERRED EMBODIMENTS

Figure 1:
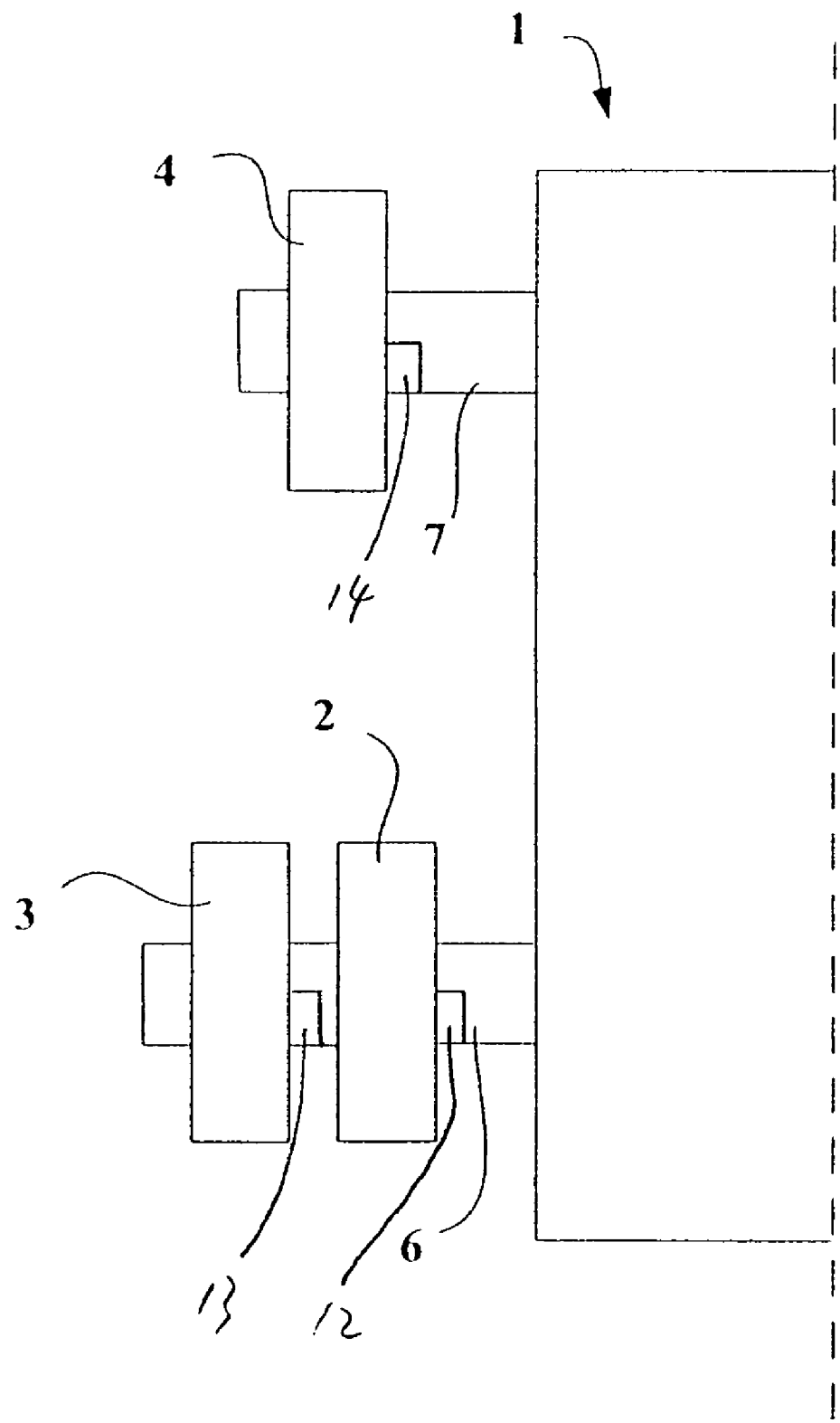
FIG. 1 shows a schematic diagram, viewed from above, of a vehicle according to the invention.

FIG. 1 is a diagrammatic representation of a half-vehicle 1 configured in accordance with the invention and comprising four tires on the rear axle 6 and two steering tires on the front axle 7. Since the Figure shows only half of the vehicle, only two tires 2, 3 are shown on the rear axle 6 and one tire 4 on the front axle 7.

The vehicle 1 shown diagrammatically in this FIG. 1 is a heavy vehicle having a total loaded weight of the order of 630 metric tons.

The tires with which the vehicle is fitted are large tires whose aspect ratio H/S is equal to 0.80, H being the height of the tire on the rim and S the maximum axial width of the tire when the latter is mounted on its service rim and inflated to its recommended pressure. The tires are of dimension 59/80R63.

These tires comprise a radial carcass reinforcement composed of inextensible metal cables of steel, oriented radially and anchored in each tire bead.

The tires 2, 3 and 4 are mounted using the method described in patent application WO 00/71365. According to this method, the axles 6 and 7 of the vehicle are designed to receive the tires 2, 3 and 4 through the intermediary of rings having a surface forming the tire bead receiving seat. The surface of these rings is advantageously frustoconical in shape. The receiving rings are themselves locked on the hubs of the axles through the intermediary of locking rings, one part of whose surface is complementary in shape to that of recesses provided on said hubs in which said locking rings are inserted.

The tires 2 and 3 ensure transmission of part of the motive power, being moved at different speeds of rotation, at least on bends.

According to the invention, the tire 4 mounted on the front axle 7 also participates in transmission of the motive power. The fact that the tire 4 transmits part of the motive power improves handling of the vehicle on curved trajectories. In fact, motive power transmitted partially by the tires of the front axle facilitates following of the trajectory when these same tires are turned, in particular when the vehicle is loaded. It would appear, in fact, that under certain loading and travel conditions, handling of such a vehicle over a curved trajectory, when fitted with four tires 2, 3 such as described above on the rear axle 6, transmitting the motive power, is very difficult or indeed impossible, since the vehicle does not respond to the turning imposed by the tires of the front axle. These conditions may furthermore result in splitting and destruction of the tires of the front axle. The invention furthermore allows an improvement in the wear to the tires on the front axle.

According to a variant embodiment of the invention, the only essential function of the tire 3 is load bearing—it does not participate in the transmission of motive power. Such an embodiment consists in fixing the tire 3 on a system of the free wheeling type, which allows free rotation of said tire 3. When the vehicle follows a curved course, in particular on bends with a small radius of curvature, this embodiment allows it to follow its course without suffering from supplementary stresses due solely to its position on the axle, which causes it to follow a longer or shorter trajectory than the tires 2.

Tests were performed using two vehicles. The first vehicle comprises four tires mounted on the rear axle and transmitting the motive power, the tires of the front axle not being motor-driven. The second vehicle comprises, in accordance with the invention, four tires mounted on the rear axle, only the two axially inner tires transmitting part of the motive power, and two tires mounted on front axle transmitting part of the motive power.

The two vehicles followed the same course under the same load conditions. It turned out that the vehicle according to the invention exhibits greatly improved handling, in particular when following curved trajectories with relatively small radii of curvature.

Furthermore, in terms of wear, the tires of the rear axle of the vehicle according to the invention had a better appearance than those of the conventional vehicle.

An observation of the same type was made for the tires of the front axle, the front axle tires motor-driven in accordance with the invention actually exhibiting less wear.

Another variant of the invention provides for the tires 4 on the front axle 7, participating in transmission of the motive power, to be controlled individually by electric motors. Such an embodiment makes it possible to facilitate variable, optionally progressive, transmission of the motive power through the intermediary of these tires 4 as a function of the trajectory followed by and the load status of said vehicle.

It is also possible according to the invention to fit all the tires 2, 3 and 4 of the vehicle with electric motors 12, 13 and 14, respectively, which are disposed in the vicinity of the respective tires 2, 3 and 4, to allow variable, optionally progressive, transmission of motive power through the intermediary of each of the tires as a function of the trajectory followed by and the load status of said vehicle.

Figure 2:
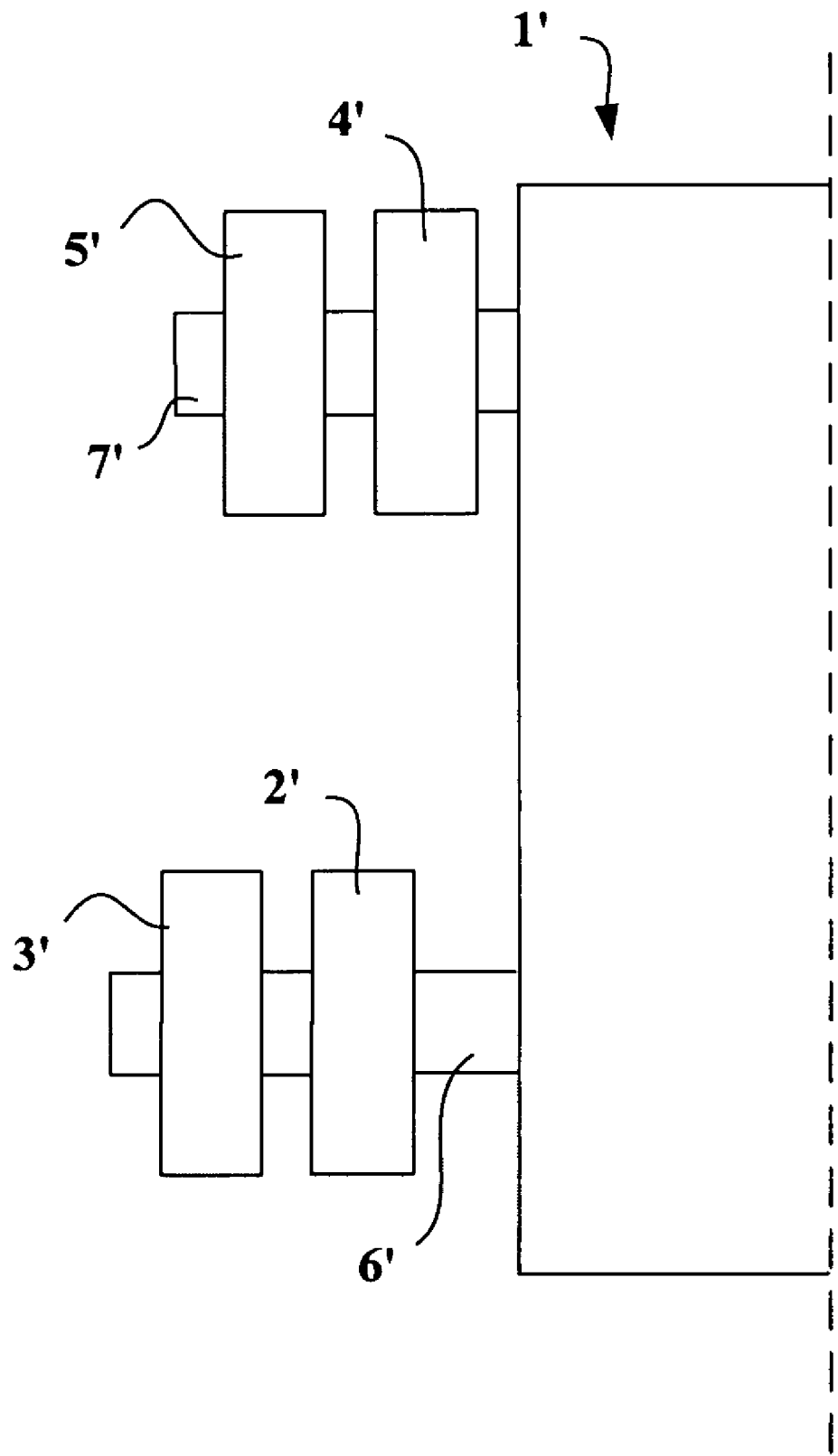
FIG. 2 shows a diagram, viewed from above, of a vehicle according to a second embodiment of the invention, To simplify understanding thereof, the Figures are not to scale. The Figures show only half of the vehicles, which extend symmetrically relative to the axis XX', which represents the longitudinal median plane of the vehicle.

FIG. 2 illustrates another embodiment of a vehicle 1' according to the invention, which differs from the previous embodiment by the presence of a supplementary tire 5' mounted on the front axle 7', which is therefore a steering tire. The addition of this tire 5' makes it possible to distribute the load over more tires. Such an embodiment makes it possible, for example, to increase still further the loading capacity or alternatively to permit a reduction in the dimension of the tires. Such a configuration according to the invention may lead in particular to a loading capacity of the order of 840 metric tons.

The embodiment according to FIG. 2 also makes it possible to improve handling of the vehicle under conditions such as those mentioned above as being liable to result in splitting of the steering tires of the front axle 7'. In fact, the increase in number of tires makes it possible better to resist the stresses resulting in splitting and thus to succeed in imposing the change in direction.

In such an embodiment of a vehicle 1', the tire 5' may have the sole function of bearing part of the load. According to other variant embodiments, the tire 5' may participate in transmission of the motive power either permanently or temporarily, as mentioned above, or alternatively variably, for example by using electric motors. In accordance with the invention, when the tires 4' and 5' participate in transmitting the motive power, the latter are moved at different speeds of rotation, at least on bends.

The invention claimed is:

1. A heavy load-carrying vehicle of a mass greater than 500 metric tons and operable to generate a motive power, comprising:
    a front axle;
    at least two front tires mounted on the front axle;
    a rear axle for transmitting at least part of the motive power, the rear axle being spaced from the front axle; and
    at least four rear tires mounted on the rear axle,
    wherein each of the front and rear tires has a diameter greater than 3.5 meters and an axial width greater than 37 inches,
    wherein, at least when the vehicle is following a non-rectilinear trajectory,
        the at least two front tires transmit part of the motive power, and
    wherein at least when the vehicle is following a non-rectilinear trajectory, at least one of
        the at least two front tires each have different speeds of rotation, and
        the at least four rear tires each have different speeds of rotation.

2. The vehicle of claim 1, wherein the at least two front tires permanently transmit part of the motive power.

3. The vehicle of claim 1, wherein two of the at least four rear tires transmit part of the motive power.

4. The vehicle of claim 1, wherein the at least two front tires comprise four front tires, at least two axially inner tires of the four front tires transmitting part of the motive power.

5. The vehicle of claim 1, wherein each of the tires transmitting the motive power is controlled by an electric motor.

6. The vehicle of claim 1, wherein the front axle is a steering axle.

7. The vehicle of claim 1, wherein the vehicle is a mining dump truck.

8. The vehicle of claim 1, wherein the at least two front tires comprise at least four front tires, and wherein the at least four front tires each have different speeds of rotation when the vehicle is following a non-rectilinear trajectory.

* * * * *